Oct. 25, 1949.  R. H. GODDARD  2,486,019
JET CONTROL APPARATUS APPLICABLE
TO ENTRAINMENT OF FLUIDS
Filed Jan. 11, 1943  3 Sheets-Sheet 2
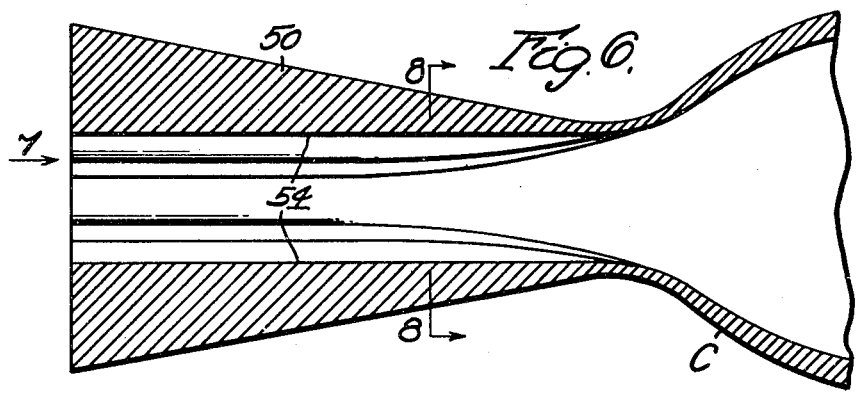
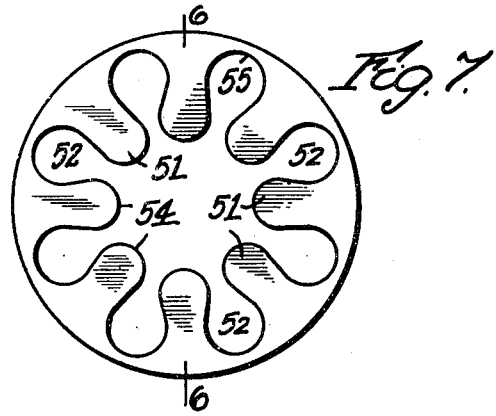
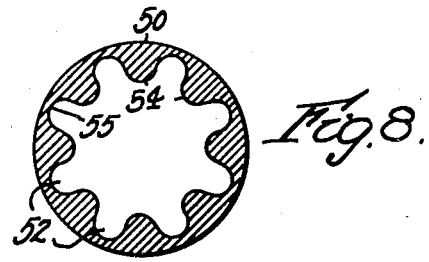
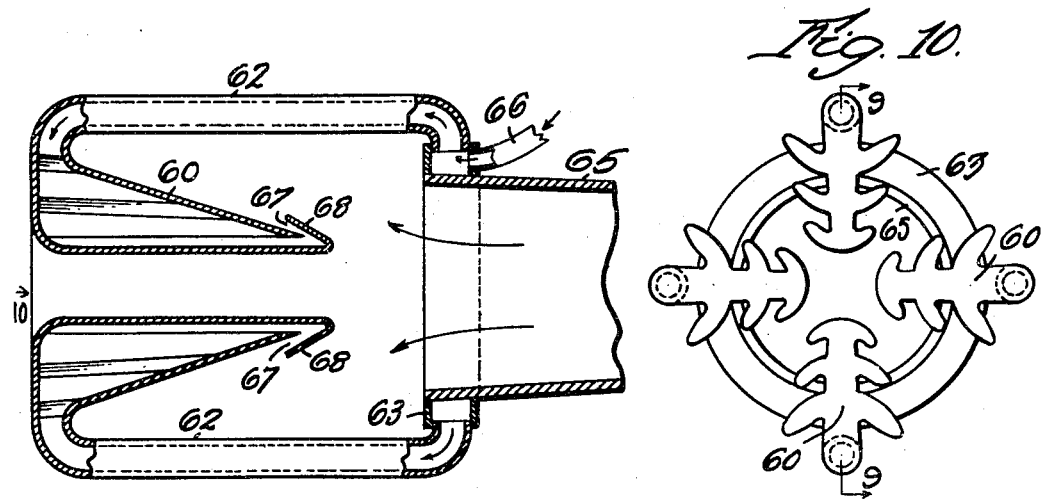

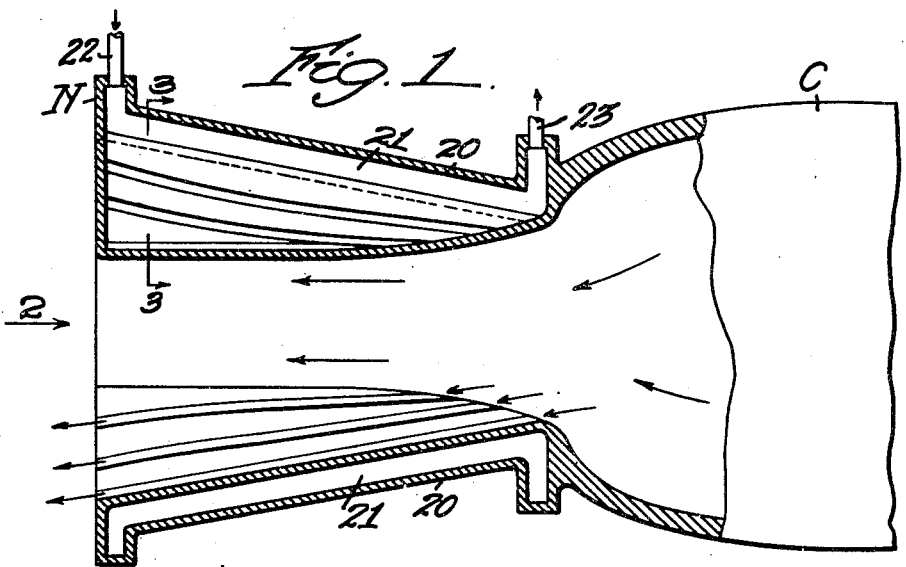
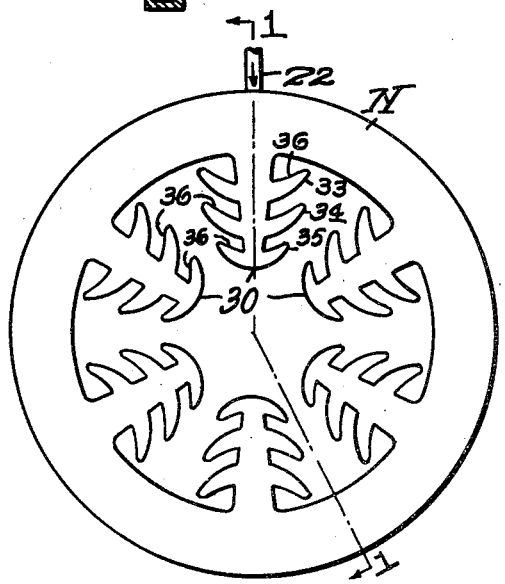
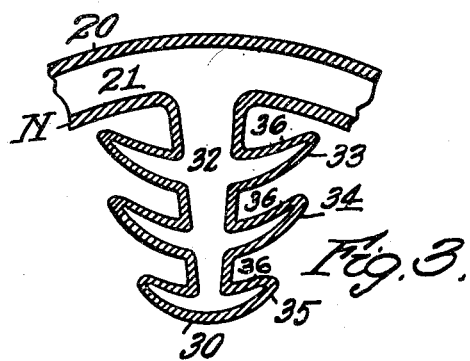
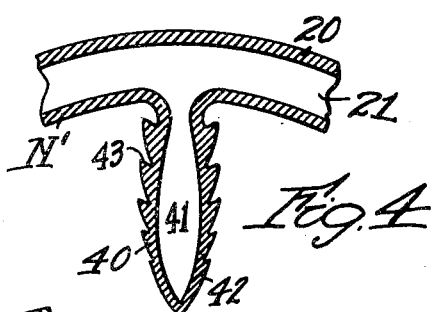
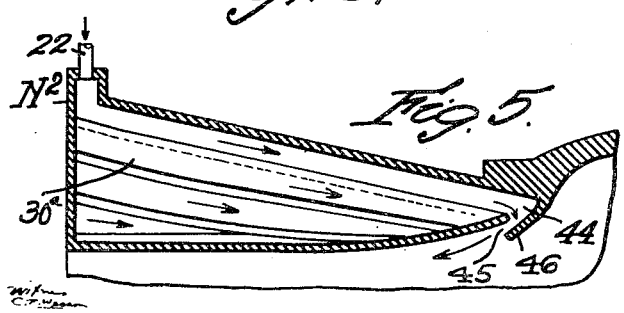

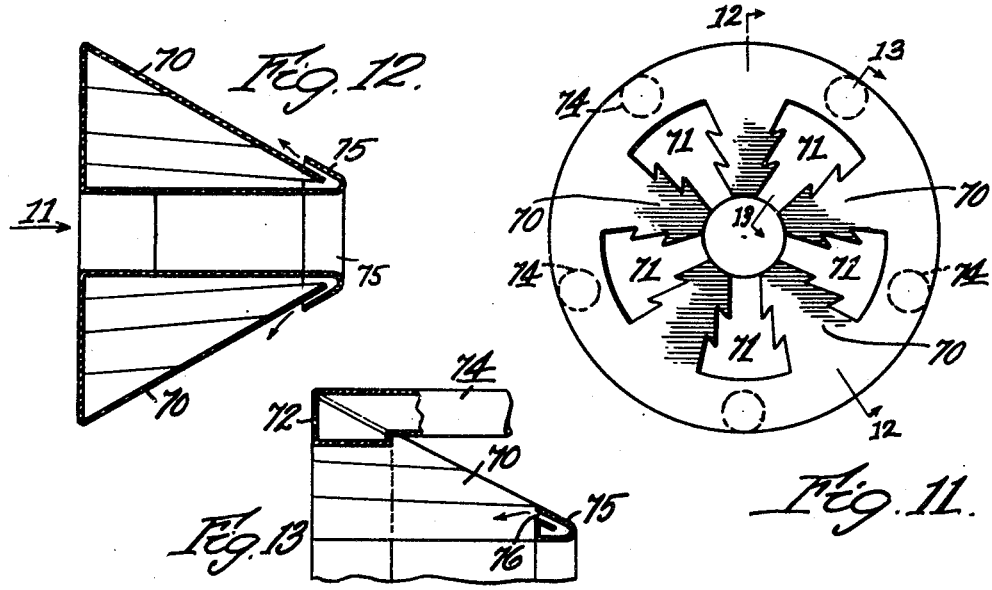
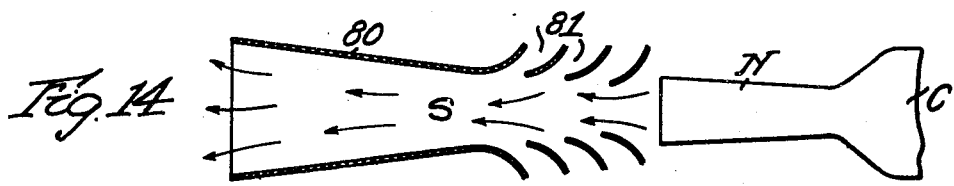
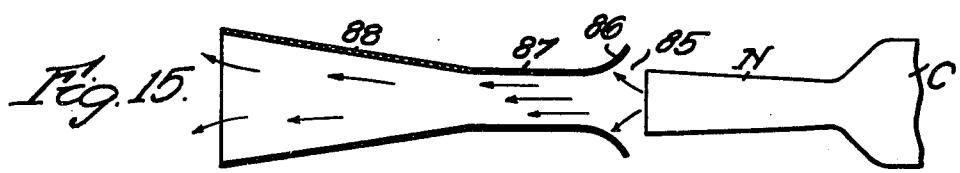
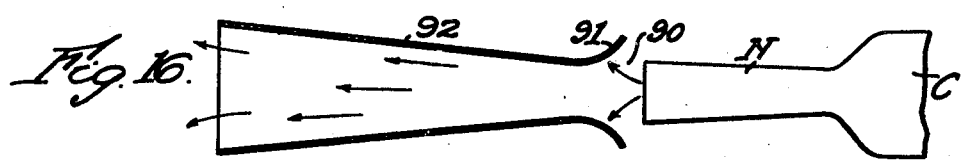

Patented Oct. 25, 1949

2,486,019

UNITED STATES PATENT OFFICE 2,486,019

JET CONTROL APPARATUS APPLICABLE TO ENTRAINMENT OF FLUIDS

Robert H. Goddard, Roswell, N. Mex., assignor of one-half to The Daniel and Florence Guggenheim Foundation, New York, N. Y., a corporation of New York Application January 11, 1943, Serial No. 472,017

10 Claims. (Cl. 230—95)

This invention relates to high speed jets of gas or vapor, and to the utilizing of such jets for desired purposes, such as the inductive entrainment of fluids.

Such jets, as they are delivered from their associated nozzles, are generally compact and homogeneous streams of gas or vapor, with all parts thereof moving in substantially the same direction and at substantially the same speed. Such compact and homogeneous jets or streams are not well adapted to inductively entrain air, water or other fluids.

It is the general object of my invention to provide means for subdividing and opening out such a compact gas stream or jet, with varying divergencies and with intervening spaces of reduced density, thereby substantially increasing the effectiveness of said jet or gas stream.

Other objects of the invention are to provide means for accomplishing such subdivision and opening-out with small loss in gas velocity and without overheating any associated structure.

Further features of the invention relate to novel and useful applications of the divergently subdivided streams or jets, and particularly to the use of such jets in auxiliary expansion nozzles for entrainment of fluids or to conserve power otherwise lost in "after-burning."

My invention further relates to arrangements and combinations of parts which will be hereinafter described and more particularly pointed out in the appended claims.

Preferred forms of the invention are shown in the drawings, in which

Fig. 1 is a sectional front elevation of one form of my improved jet-manipulating structure, taken along the irregular line 1—1 in Fig. 2;

Fig. 2 is an end view, looking in the direction of the arrow 2 in Fig. 1;

Fig. 3 is a detail sectional view, taken along the line 3—3 in Fig. 1;

Fig. 4 is a view similar to Fig. 3 but showing a modified construction;

Fig. 5 is a partial sectional front elevation, showing a modification of the structure shown in Fig. 1;

Fig. 6 is a sectional front elevation showing my invention in a further modification;

Fig. 7 is an end view, looking in the direction of the arrow 7 in Fig. 6;

Fig. 8 is a transverse sectional view, taken along the line 8—8 in Fig. 6;

Fig. 9 is a front elevation, partly in section along the line 9—9 in Fig. 10 and showing my invention as a separate unit mounted at the discharge end of a combustion chamber nozzle;

Fig. 10 is an end view, looking in the direction of the arrow 10 in Fig. 9;

Fig. 11 is an end view similar to Fig. 10 but showing a modification of the structure shown in Figs. 9 and 10;

Fig. 12 is a sectional elevation, taken along the irregular line 12—12 in Fig. 11;

Fig. 13 is a partial sectional elevation, taken along the line 13—13 in Fig. 11; and Figs. 14, 15 and 16 are longitudinal elevations, partly in section, showing different methods of utilizing the advantages of my invention.

Referring to Figs. 1, 2 and 3, I have shown a portion of a combustion chamber C which may be of the general outline and construction shown in my prior Patent No. 1,103,503. Combustion in the chamber C produces a forceful discharge of combustion gases from the rear or left-hand end of the chamber C, which gases are very hot and travel at very high speed.

I also provide an expansion nozzle N which is in the form of an outwardly expanding cone and of somewhat steeper pitch than is shown in the cited patent. A water jacket 20 surrounds the nozzle N, and water for the jacket space 21 may be supplied through the pipe 22 and may be discharged through the pipe 23.

For the purposes of my present invention, I provide a plurality of spaced vanes or gas-deflecting members 30, mounted within the nozzle N and extending axially toward the open end thereof. Each vane 30 comprises a relatively deep hollow middle portion 32 (Fig. 3) and a series of pairs of hollow ribs 33, 34 and 35. All inner spaces of the gas-deflecting structure communicate freely with the jacket space 21.

The various ribs 33, 34 and 35 curve outward toward the open end of the nozzle, as shown in Fig. 1, and their outer surfaces 36 are made concave, so as to provide what might be described as outwardly expanding shelves with raised edges.

With this construction, the compact stream of gas leaving the combustion chamber C will engage the inner ends of the successive deflecting members 30, and portions of the gas stream will be deflected along diverging paths by the concave and outwardly expanding surfaces 36, while other portions of the gas stream will travel through the unobstructed axial portion of the nozzle and through the unobstructed spaces between the members 30. The gas stream will thus be broken up into more or less separated portions which flow along diverging paths and which, instead of being compact and homogeneous, will issue from the open end of the nozzle as a divergent stream which is no longer homogeneous and in which different portions are of widely different density and flow with limited but significant differences in velocity.

Such a divergent stream is very well adapted to entrain gases, water or other fluids by inductive action and in much larger quantities than could be entrained by the usual compact and homogeneous gas jet or vapor stream in which all parts are traveling at substantially the same speed and in the same direction. It will be noted that all parts of the nozzle N and members 30 are effectively water-cooled.

In Fig. 4 I have shown a modified construction in which a plurality of ribs 40 project radially inward from the conical inner wall of the nozzle N'. Each of the ribs 40 is of hollow construction, with a space 41 therein communicating with the jacket space 21. The side wall 42 of the member 40 is of reduced thickness toward the axis of the nozzle, for more efficient cooling.

In its thicker outer portions, the wall 42 of the member 40 is grooved or notched, as indicated at 43, and the shoulders of the notches are concaved or outwardly directed to produce somewhat the same diverting effect as the concave surfaces 36 in the form shown in Figs. 1 to 3. The construction shown in Fig. 4 is somewhat simpler and provides less obstruction to the nozzle opening and is effective to break up and diversify a gas stream sufficiently for certain purposes to which it is particularly adapted.

In Fig. 5 I have shown gas diverting structure similar to that shown in Fig. 1, but with the rear end portion 44 of each diverting element 30ª communicating with a slot or opening 45 adjacent a guide or flange 46. The cooling water or other fluid, after passing through the gas-deflecting members 30ª, is ejected through the slots or openings 45 and is diverted toward the left-hand or discharge end of the nozzle N². The cooling fluid then continues to flow rearward and flows in part between and around the deflecting members 30ª, thus substantially increasing the cooling effect. The jet action of the gases also tends to increase the flow of coolant.

The form of my invention shown in Figs. 6, 7 and 8 is simple and rugged and possesses many of the advantages of the more complex forms previously described. In this construction, a nozzle 50 is provided with a plurality of inwardly projecting ribs 51 spaced apart by longitudinal recesses 52. The inner edges 54 of the ribs 51 are preferably parallel to the axis of the nozzle 50, and the outer walls 55 of the recesses 52 are preferably parallel to the outer surface of the nozzle 50.

Consequently, the ribs 51 and recesses 52 increase in both height and width toward the discharge end of the nozzle 50. The recesses 52 are also of substantially greater width adjacent their outer walls 55 and more constricted adjacent the axis of the nozzle, so that the longitudinally extended and outwardly enlarged recesses 52 have a marked diverting effect on the stream of gases entering the nozzle 50 from the combustion chamber C. This form of my invention may be made as a simple casting or forging and does not require special provision for cooling.

In the forms previously described, I have shown my invention disposed within the discharge nozzle itself and as a structural part thereof, but my invention may also be utilized to advantage in the forms shown respectively in Figs. 9 and 10 and in Figs. 11 to 13. In both of these forms, the means for diverting and controlling the gas jet is formed as a separate unitary structure mounted beyond the discharge end of the nozzle, rather than within the nozzle itself and as an integral part thereof.

In the construction shown in Figs. 9 and 10, the gas diverting elements 60 are similar in construction to the elements 30 shown in Figs. 2 and 3, but each element 60 is formed as a separate unit. Each element 60 is mounted at its outer or rear end on a pipe 62, which pipe is connected at its forward end to a hollow annular member or ring 63, which in turn is permanently mounted on the outer end of the nozzle 65. Water or other cooling fluid may be supplied through a pipe 66 to the ring 63 and pipes 62.

At their forward or right-hand ends, as viewed in Fig. 9, the gas diverting elements 60 discharge their cooling fluid through end slots 67 and against rearwardly and outwardly directed guide flanges 68. The re-routed cooling fluid then travels along with the discharged combustion gases and has a considerable additional cooling effect on the outer surfaces of the members 60. This form of my invention has the advantage that it may be readily applied as an additional unitary structure to a combustion chamber nozzle already in use.

In Figs. 11 to 13, I have shown gas diverting elements 70 of hollow construction, resembling the elements 30 shown in Fig. 3 but having less pronounced side ribs. The elements 70 are substantially spaced apart, as shown in Fig. 11, and with intervening openings 71.

Instead of being mounted on separate pipes as in Figs. 9 and 10, the elements 70 are mounted at their outer or rear ends on a hollow annular member or ring 72 (Fig. 13) which is substantially triangular in cross section and which is itself supported on a plurality of pipes 74 through which water or other cooling fluid may be supplied.

At their forward or right-hand ends as viewed in Figs. 12 and 13, the diverting elements 70 are connected to a second hollow annular member or ring 75. This member is also substantially triangular in cross section (Fig. 13) and has an open annular slot 76 through which the cooling fluid may be discharged rearwardly and outwardly along the outer surfaces of the diverting elements 70. The cooling effect is similar to that previously described as being produced with the construction shown in Figs. 9 and 10.

The construction shown in Figs. 11 to 13 is somewhat more rigid than that shown in Figs. 9 and 10, as both the forward and rearward ends of the diverting elements 70 are firmly secured to continuous annular supporting members.

In all forms of my invention, it should be noted that the transformation of a compact jet to a striated stream is accomplished without abrupt change in direction of gas flow and consequently without substantial impact or loss of speed.

The diverted and striated streams of gas produced by the use of my invention may be utilized for many useful purposes. Three such applications in connection with expansion nozzles are indicated in Figs. 14, 15 and 16. The nozzle N in each of these figures is assumed to embody my invention in one of the forms shown in Figs. 1 to 8.

In Fig. 14, the nozzle N discharges its gases into the forward or smaller end of an expansion nozzle 80 having air inlet ports or louvers 81. A striated stream S of diverted discharge gases flows through the expansion nozzle 80, and air is drawn in by induction or jet action through the ports 81.

As the stream S consists of more or less separated gaseous streamlets, with spaces of relatively low density intervening, the air or other fluid entering through the ports 81 will be drawn into the stream very effectively and much more rapidly than by a compact and homogeneous gas jet.

The open structure of the stream also causes rapid mixing and heating of the entrained air, with corresponding expansion. This substantially increases the rate of flow through the expansion nozzle 80, from which the combined stream of gases and air is discharged in a uniform and efficient manner.

In the construction shown in Fig. 15, the air is drawn in through a single annular port 85, flanked by a guide plate 86. The gases and entrained air are then thoroughly mixed and uniformly heated in the cylindrical portion 87 of the expansion nozzle, after which they expand in the discharge portion 88. By such expansion, the rate of discharge of the gaseous mixture is substantially increased.

In Fig. 16 the air is drawn in through a port 90 flanked by a guide-plate 91, as in Fig. 15, but is discharged directly into an expansion nozzle 92. This construction is particularly useful in connection with rocket motors, where "after-burning" sometimes produces minor explosions or detonations as the gases leave the nozzle N. With the construction shown in Fig. 16, these minor explosions take place in the expansion nozzle 92, and thus produce an additional reaction which converts at least a part of the unconsumed gases to useful energy. The air entering through the port 90 aids in producing more complete combustion and also forms a cooling layer between the highly heated gas stream and the inner surface of the nozzle 92.

These applications of my invention are illustrative only, and many other useful applications of the invention may be readily devised by those skilled in the art.

In all forms of my invention, the middle portion or core of the gas stream continues to flow along a substantially axial path.

Having thus described my invention and the advantages thereof, I do not wish to be limited to the details herein disclosed, otherwise than as set forth in the claims, but what I claim is:

1. In a jet control apparatus applicable to entrainment of fluids, a gas discharge nozzle, and gas-diverting means associated with said nozzle and projecting into the gas stream to divert portions thereof along radially divergent paths, said diverting means comprising gas-engaging elements extending radially inward toward the axis of said nozzle and also longitudinally of said nozzle, the gas-engaging elements being enlarged in height and spacing toward the discharge end of said nozzle, and being provided with gas-engaging surfaces effective to divert portions of the gas stream radially outward, and means for the entrainment of fluids positioned adjacent to the outer end of the nozzle with reference to the flow of gases.

2. In a jet control apparatus applicable to entrainment of fluids, a gas discharge nozzle, and gas-diverting means associated with said nozzle and projecting into the gas stream to divert portions thereof along radially divergent paths, said diverting means comprising gas-engaging elements extending radially inward toward the axis of said nozzle and also longitudinally of said nozzle, each gas-engaging element having a plurality of gas-diverting and circumferentially-disposed lateral projections increasingly spaced from the nozzle axis toward the discharge end of said nozzle, and means for the entrainment of fluids. positioned adjacent to the outer end of the nozzle with reference to the flow of gases.

3. In a jet control apparatus applicable to entrainment of fluids, a gas discharge nozzle, and gas-diverting means associated with said nozzle and projecting into the gas stream to divert portions thereof along radially divergent paths, said diverting means comprising gas-engaging elements extending radially inward toward the axis of said nozzle and also longitudinally of said nozzle, each gas-engaging element having a plurality of lateral projections increasingly spaced from the nozzle axis toward the discharge end of said nozzle and concave radially outwardly, and said projections producing an increasing diverting effect on the portions of the gas stream engaged thereby, and means for the entrainment of fluids positioned adjacent to the outer end of the nozzle with reference to the flow of gases.

4. In a jet control apparatus applicable to entrainment of fluids, a gas discharge nozzle, and gas-diverting means associated with said nozzle and projecting into the gas stream to divert portions thereof along radially divergent paths, said gas-diverting means being mounted within said nozzle and having a plurality of substantially circumferential, radially and outwardly diverting gas-engaging surfaces, and means for the entrainment of fluids positioned adjacent to the outer end of the nozzle with reference to the flow of gases.

5. In a jet control apparatus applicable to entrainment of fluids, a discharge nozzle, a plurality of gas-diverting devices associated with said nozzle and projecting into the gas stream to divert portions thereof along divergent paths, a water jacket for said nozzle, and connections from said water jacket to said gas-diverting devices, said gas-diverting devices being mounted within said nozzle and each device comprising a plurality of hollow gas-engaging and outwardly-diverting elements, and means for the entrainment of fluids positioned adjacent to the outer end of the nozzle with reference to the flow of gases.

6. In a jet control apparatus applicable to entrainment of fluids, a gas discharge nozzle, and gas-diverting means associated with said nozzle and projecting into the gas stream to divert portions thereof along divergent paths, said gas-diverting means comprising separate hollow gas-engaging devices each mounted rearward of but adjacent to said nozzle, each device being supported by a pipe fixed on said nozzle, and said pipes being collectively effective to supply cooling fluid to all of said devices, and means for the entrainment of fluids positioned adjacent to the outer end of the nozzle with reference to the flow of gases.

7. In a jet control apparatus applicable to entrainment of fluids, a gas discharge nozzle, gas-diverting means associated with said nozzle and projecting into the gas stream to divert portions thereof along divergent paths, said diverting means comprising a plurality of separate hollow gas-engaging devices each mounted rearward of but adjacent to said nozzle, each device being supported by a pipe fixed on said nozzle and said pipes being collectively effective to supply cooling fluid to all of said devices, and means to thereafter discharge the cooling fluid from said devices in a rearward and outward direction and away from said nozzle, and means for the entrainment of fluids positioned adjacent to the outer end of the nozzle with reference to the flow of gases.

8. In a jet control apparatus applicable to entrainment of fluids, a gas discharge nozzle, gas-diverting means associated with said nozzle and projecting into the gas stream to divert portions thereof along divergent paths, said gas-diverting means comprising a plurality of separate hollow gas-engaging devices each and all connected at front and rear ends to hollow annular cooling rings supported adjacent to but rearward of said nozzle, means to supply a cooling fluid to the outer and rearward ring, and means to discharge said cooling fluid outward and rearward from the inner and forward ring, and means for the entrainment of fluids positioned adjacent to the outer end of the nozzle with reference to the flow of gases.

9. In a jet control apparatus applicable to entrainment of fluids, a gas discharge nozzle, and gas-diverting means associated with said nozzle and projecting into the gas stream to divert portions thereof along divergent paths, said gas-diverting means having a multiplicity of substantially circumferential gas-engaging surfaces which are increasingly spaced radially from the axis of said nozzle in the direction of gas flow, and means for the entrainment of fluids positioned adjacent to the outer end of the nozzle with reference to the flow of gases.

10. In a jet control apparatus applicable to entrainment of fluids, a gas discharge nozzle, and gas-diverting means associated with said nozzle and projecting into the gas stream to divert portions thereof along divergent paths, said gas-diverting means having a multiplicity of substantially circumferential gas-engaging surfaces which are increasingly spaced radially from the axis of said nozzle in the direction of gas flow and which are substantially concave on their radially outward surfaces to increase their gas-diverting efficiency, and means for the entrainment of fluids positioned adjacent to the outer end of the nozzle with reference to the flow of gases.

ROBERT H. GODDARD.

REFERENCES CITED

The following references are of record in the file of this patent:

UNITED STATES PATENTS

| Number | Name | Date |
| --- | --- | --- |
| 1,873,505 | Stipa | Aug. 23, 1932 |
| 2,112,672 | Lasley | Mar. 29, 1938 |

FOREIGN PATENTS

| Number | Country | Date |
| --- | --- | --- |
| 844,442 | France | Apr. 24, 1939 |